MAGNETIC TAPE EDITING SYSTEM WITH A BILEVEL SIGNAL AMPLIFIER

Filed Feb. 9, 1967 2 Sheets-Sheet 1

INVENTORS
YUZURU INOUE
SHUICHI WADA

BY Louis Bernat
ATTORNEY

INVENTORS.
YUZURU INOUE
SHUICHI WADA
BY Louis Bernat
ATTORNEY 3,506,793

MAGNETIC TAPE EDITING SYSTEM WITH A BILEVEL SIGNAL AMPLIFIER

Yuzuru Inoue, Tokyo, and Shuichi Wada, Nagoya, Japan, assignors to Victor Company of Japan, Limited, Kanagawa-ku, Yokohama City, Japan Filed Feb. 9, 1967, Ser. No. 614,933
Claims priority, application Japan, Feb. 23, 1966, 41/10,907
Int. Cl. G11b *27/02, 27/08;* H04n *1/28*
U.S. Cl. 179—100.2 11 Claims

ABSTRACT OF THE DISCLOSURE

An editing system for an information recorder is disclosed. The illustrated embodiment, adapted for incorporation with a helical-scan, magnetic tape, video recorder comprises a bilevel signal amplifier for amplifying the beginning portion of a new signal segment which is recorded over an existing signal on a prerecorded tape at a higher signal level than the remaining portion of the new signal segment which is recorded on erased tape. By recording the beginning portion of the new signal at a higher signal level, the distracting effects of a "beat signal" editing mark are reduced or eliminated.

This invention is an editing system for an information recorder, and, more particularly, an editing system for a magnetic tape recorder for recording and reproducing video signals.

With tape recorders of the prior art containing simultaneously energized and de-energized erasing and recording heads separated by a fraction of an inch to several inches, editing marks are generated when a new signal is edited onto or added to a pre-recorded tape. In the case of a video tape recorder, these editing marks generate visual distractions when the signals are reproduced and, therefore, lower the quality of the tape recording.

As more fully described in our copending application, Ser. No. 594,760, filed Nov. 16, 1966, these editing marks are generated by a portion of the tape located at the beginning of the newly recorded segment upon which both the new and the old signals are recorded and at the end of the newly recorded segment where no new signal is recorded over the area which has been erased.

Accordingly it is a principal object of this invention to provide an editing system which eliminates distracting editing marks caused by the appearance of double-recorded and erased portions of the magnetic tape, or other storage medium, at the beginning and the end of the newly recorded segment.

This and other objects, features and advantages of this invention will become more fully apparent in the following description of a preferred embodiment incorporated in a helical-scan, video, magnetic tape recorder in which.

Figure 1:
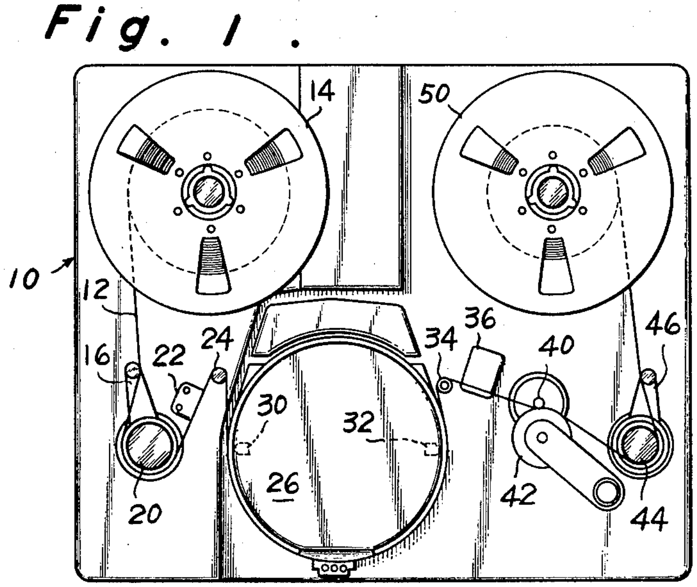
FIGURE 1 is a top view of a helical-scan type, video, magnetic tape recorder incorporating an editing system of this invention.

FIGURE 1 illustrates a video magnetic tape recorder 10 incorporating an embodiment of the invention. A magnetic tape 12 stored on a reel 14 is drawn through a path around a tension arm 16, a guide roller 20, a magnetic erasing head 22, a guide roller 24, a guide drum 26 having rotary magnetic heads 30 and 32 for recording and reproducing a video signal, a guide roller 34, control and audio signal recording head 36, capstan 40, pinch roller 42, guide roller 44 and tension arm 46 to reel 50. The longitudinal axis of the tape 12 is transverse to the locus of gaps of the heads 30 and 32 so that oblique tracks 52 are recorded on the tape as diagrammatically shown as FIGURE 2A. The erasing head 22 is orthogonally oriented with respect to the longitudinal axis of the tape so that it erases rectangular portions of the tape bounded by lines parallel to line 54 which is perpendicular to the longitudinal axis of the tape. Similarly, the recording axis of the head 36 is perpendicular to the longitudinal axis of the tape.

Figure 2:
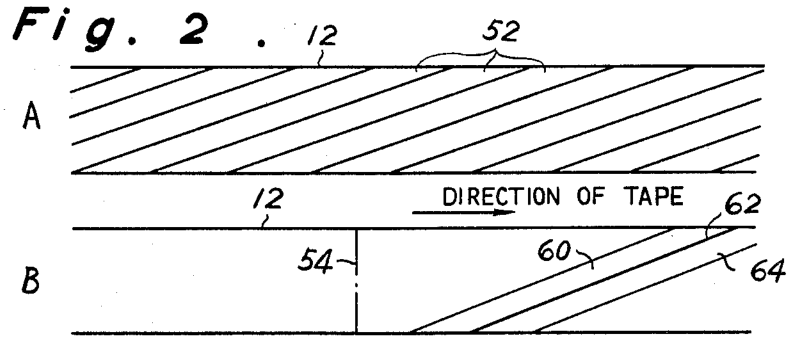
FIGURES 2A and 2B are diagrams of the tracks recorded on magnetic tape by the recorder of FIGURE 1.

Referring to FIGURE 2B, where helical scan recorders in which simultaneously energized rotary magnetic recording heads are used, only the portion of the tape left of the line 54 is erased while the new signal is recorded starting with track 60 adjacent to line 62. The trapezoidal portion of the tape, bounded by the edges of the tape and lines 54 and 62, contains the new signal recorded over the old signal. When this tape is replayed, the information contained within the trapezoidal portion is reproduced as a distracting beat signal or editing mark.

At the end of the new signal portion, the erasing and the rotary recording heads are de-energized simultaneously and a trailing-edge trapezoid portion bounded by lines 54 and 62 is formed in which no signal is recorded, causing another editing mark. The trapezoidal blank portion is formed because the last scan of the new signal is recorded on track 64 whereas the tape has been erased in the rectangle extending to the right from line 54.

In our copending application, Ser. No. 594,760, filed Nov. 16, 1966, an editing system is described which delays the time at which the recording heads are energized or de-energized from the time that the erasing head is energized or de-energized. With that system, the recroding of a new segment does not begin until the erased portion of the magnetic tape comes in contact with the recording head guide drum 26. At the end of the newly recorded segment, the de-energization of the recording heads is delayed until the last portion of the tape erased by erasing head 22 reaches the last point of contact between the drum 26 and the tape 12 near guide roller 34. The results obtained are excellent in most applications; however, where it is necesary to begin the recording of a new segment without any delay, that editing system cannot be used.

The editing system of the present invention overcomes the disadvantages of the editing system described above because it can commence recording a new signal without waiting for the erased portion of the magnetic tape to reach the recording head.

With the editing system of this invention, "beat signal" editing marks generated when a double-recorded portion of the tape is replayed are eliminated or reduced in magnitude by recording the beginning portion of the new signal over the original signal at a higher than normal recording level.

Generally, when a frequency modulated signal is recorded on and reproduced from magnetic tape, there are maximum reproduction or output signal levels which can be attained from a given range of recording voltages.

Figures 4, 5, 6:
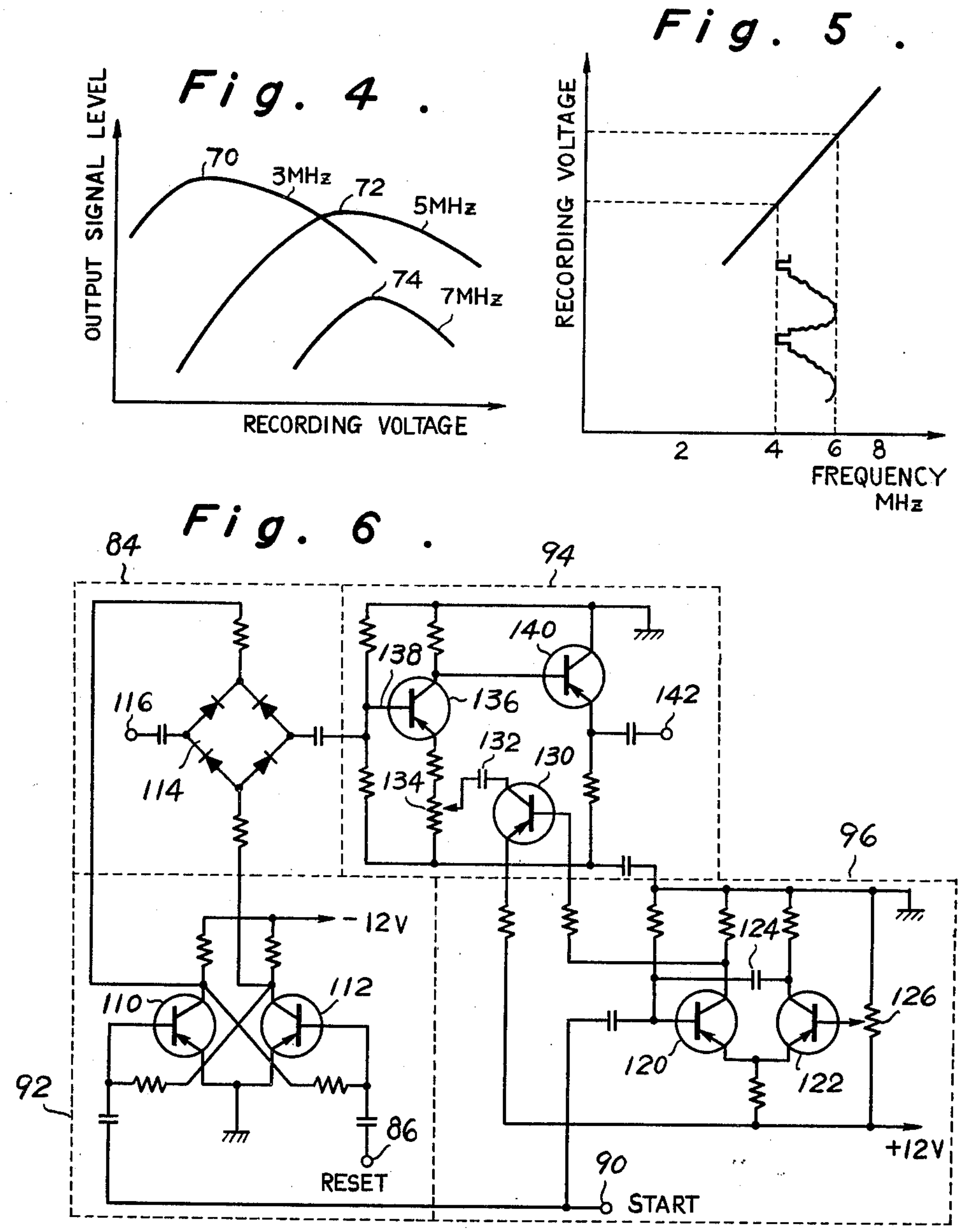
FIGURE 4 is a graph of the output level versus recording voltage function at three recording frequencies for the video tape recorder of FIGURE 1.
FIGURE 5 is a graph of the recording voltage versus recording frequency for the video tape recorder of FIGURE 1.
FIGURE 6 is a schematic diagram of the circuit of the embodiment of the editing system incorporated in the video tape recorder of FIGURE 1.

As illustrated in FIGURE 4, where the output signal levels are graphed as a function of recording voltage for 3 mHz., 5 mHz. and 7 mHz. signals, maximum output signal levels are achieved with recording voltages associated with maxima 70, 72 and 74. Any increase in the recording voltage from that which produces the maximum output signal level only causes the output signal level to decrease. Normally the recording voltage is chosen to maximize output signal level by means of a filter (not shown) which has recording voltage versus frequency characteristics such as those shown in FIGURE 5, where 4 mHz. is the carrier frequency corresponding to the black level or peak of the vertical synchronization pulse and 6 mHz. is the carrier frequency corresponding to the white level.

It is well known that the effect of the beat signal can be minimized if one of the two signals which are recorded on the same portion of the tape is at a much higher level than the other. However, because points 70, 72 and 74 represent maxima, any increases in the recording voltage cause the corresponding output signal level to decrease. Therefore, an optimal recording level for the new signal during the time it is being recorded over the old signal must be determined.

Experiments have shown that the optimum recording level for the new signal is in the range between one to six decibels higher than the normal recording level for obtaining the maximum output signal level. In recorders having rotary magnetic heads made of ferrite, the optimum value of the recording voltage is three decibels higher than the normal recording level.

With the editing system of this invention, the recording level of the new signal is increased from one to six decibels higher than normal when the new signal is being recorded directly over the old signal and then decreased to the normal level when the erased portion of the tape reaches the recording head.

Figure 3:
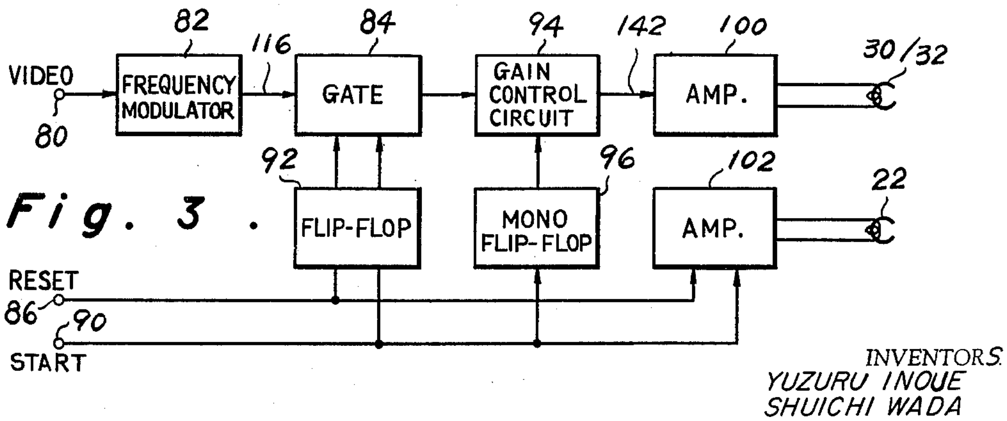
FIGURE 3 is a block diagram of the circuitry of the editing system incorporated in the video tape recorder of FIGURE 1.

A block diagram of the editing system for the video tape recorder of FIGURE 1 is illustrated in FIGURE 3. The video signal to be recorded is applied to an input terminal 80 of a frequency modulator 82. The FM output signal from the frequency modulator 82 is transmitted to a gate circuit 84. A reset pulse generated by a switch (not shown) when the end of the new signal segment is reached is applied to an input terminal 86. A start signal generated by a switch (not shown) at the beginning of the recording of the new signal segment is applied to an input terminal 90. The terminals 86 and 90 are connected to the inputs of a flip-flop 92 as shown.

When a start signal is applied to the flip-flop 92, it changes states thereby causing the gate circuit 84, which is connected to its output, to open so that video signals can be transmitted through to the input of a gain control circuit 94.

The gain control circuit 94 basically is a gated amplifier having two amplifying levels; one chosen so that optimum output signal level is achieved and the other chosen to be from one to six decibels higher than the first, for reasons which have been described above. The gain control circuit 94 is gated from one amplifying level to the other by signals from a monostable flip-flop 96 which upon receiving a start signal via terminal 90 switches from its resting state to another state and then back to its resting state after a delay in time equal to the interval required for the double-recorded portion of the tape to pass beyond the recording heads 30 and 32.

The output signal of the gain control circuit is applied to an amplifier 100 which in turn transmits it to recording heads 30 and 32 (here shown as one head).

Gates amplifier 102 provides the necessary bias signal for the erasing head 22 when it receives a start signal via terminal 90. The bias signal is terminated when a reset signal is received via terminal 86.

Referring to FIGURE 6, the flip-flop circuit 92 is comprised of transistors 110 and 112. When a positive reset trigger pulse is applied to the terminal 86, the transistor 110 switches to its ON state and the transistor 112 switches to its OFF state. The gate circuit 84 comprising a diode bridge 114 is closed because the diodes comprising the bridge are back-biased into their nonconducting states by the potential difference between the collectors of transistors 110 and 112 so that the video signal can not be transmitted to the gain control circuit 94.

When a positive start pulse, generated by a switch (not shown) which is operated at the beginning of the recording period for the new signal, is applied to the base of the transistor 110, the transistor 110 switches to its OFF state thereby causing transistor 112 to be switched ON.

The potential difference between the collectors of the transistors 110 and 112 changes polarity so that the gate circuit 84 opens and the output signal from the frequency modulator 82, appearing at terminal 116, is transmitted through the gate circuit 84 to the gain control circuit 94.

The monostable flip-flop 96 comprise transistors 120 and 122 connected in an emitter-coupled flip-flop configuration. The operation of this stage has been described above. The delay period required for the flip-flop 96 to switch back from its unstable binary state to its resting state is determined by the time constant of the network containing capacitor 124 and potentiometer 126. The potentiometer 126 is adjusted so that the delay period of the flip-flop 96 equals the interval required for a point on the tape to pass from the erasing head 22 to the last point of contact between the tape and the guide drum 26 near the guide roller 34. In this embodiment the delay period is 1.8 seconds.

When the start pulse is applied through the terminal 90 to the base of the transistor 120, that transistor switches to its OFF state and its collector drops to ground potential.

A PNP transistor 130, whose base is connected to the collector of transistor 120, is then gated ON when its base electrode is switched to ground potential. The collector circuit of the transistor 130 comprises a capacitor 132, and a potentiometer 134. The potentiometer 134 is a part of the emitter circuit of an amplifying transistor 136 which amplifies the video signals transmitted through the gate 84 to its base electrode at one of two amplifying levels as disclosed previously in the description of the function of the gain control circuit 94.

When a start pulse is applied to terminal 90, the transistor 120 switches to its OFF state and, as described above, the transistor 130 is gated into its ON state. When the transistor 130 is in its ON state, the portion of the emitter resistance of transistor 136 in parallel with the transistor 130 is short circuited so that the amount of negative feedback in the amplifier stage is reduced and the video signal is amplified by a greater than normal amount. When the monostable flip-flop 96 returns to its resting state, the transistor 130 is gated to its OFF state and the gain of the amplifier containing transistor 136 is reduced to normal.

The video signal is transmitted through a buffer amplifier containing transistor 140 and appears at output terminal 142.

In this manner, the new signal to be recorded over an existing signal is amplified to a higher-than-normal recording level for a period during which there is double recording at the beginning of the new signal segment, here 1.8 seconds commencing with the receipt of the start pulse. As stated before, the best results are obtained by adjusting the potentiometer 134 so that the higher amplification level is one to six decibels greater than the normal amplification level with a three decibel gain considered as optimum for minimizing the effects of the beat signal.

The appearance of a start pulse on terminal 90 causes both of the flip-flop circuits 92 and 96 to change states almost instantaneously. Because it is monostable, the flip-flop circuit 96 returns to its resting state at the end of the desired delay period. The flip-flop circuit 94, however, will not return to its original state until it receives a reset pulse at the end of the newly recorded segment on terminal 90. According to the requirements of the application, the flip-flop circuit 92 can be made to reset instantaneously or it can be made to reset after a period of delay commencing with the receipt of the reset pulse so that editing marks caused by erased and unrecorded portions of the tape at the end of newly recorded segments are eliminated, as described more fully in our above-identified copending application. In this manner the erasing head can be de-energized before the recording head is de-energized.

The modifications of the illustrated embodiment are practical for use in other types of video recorders and in recorders used for storing other types of information on magnetic tape as well as other storage mediums. Accordingly, the scope of the invention should be determined from the following claims.

What is claimed is:

1. An editing system for an information recorder containing a tape storage medium, an erasing head with an erase gap oriented perpendicular to the longitudinal axis of the storage medium, at least one rotary recording head for recording information on parallel tracks which form an acute angle with the longitudinal axis of the storage medium, means for transporting said storage medium past said erasing head before passing said recording head, whereby a trapezoidally shaped unerased portion of said storage medium may pass said recording head, and bilevel amplifying means for energizing said recording head, the editing system comprising:

(a) means for controlling the energization of the erasing head by said amplifying means;

(b) means responsive to said last named means for raising the level of said amplifier means for energizing the recording head with a signal to be recorded at a higher-than-normal signal level during a period commencing approximately at the same time as the time at which the erasing head is energized and lasting for approximately the same interval as that required for a point on the storage medium to move from the proximity of the erasing head to the proximity of the recording head; and (c) means for thereafter lowering the level of said amplifier means for energizing the recording head at the normal signal level after said trapezoidally shaped portion of said storage medium has passed said recording head.

2. The editing system of claim 1 wherein the period lasts for the same interval as that required for a point on the storage medium to move from the erasing head to the last point at which the recording head can record information on the storage medium.

3. An editing system for an information recorder containing an elongated storage medium, an erasing head for erasing information recorded on the storage medium with a perpendicular path with respect to the longitudinal axis of the storage medium, at least one rotary recording head for recording information on parallel tracks which form an acute angle with the longitudinal axis of the storage medium, and means for transporting said storage medium past said erasing head before passing said recording head, whereby a trapezoidally shaped unerased portion of said storage medium may pass said recording head, the editing system comprising:

(a) means for controlling the energization of the erasing head; and (b) means for energizing the recording head with a signal to be recorded at a higher-than-normal signal level during a period commencing approximately at the same time as the time at which the erasing head is energized and lasting for approximately the same interval as that required for a point on the storage medium to move from the proximity of the erasing head to the proximity of the recording head;

wherein the higher-than-normal signal level is at least one decibel higher than the normal signal level.

4. The editing system of claim 3 wherein the higher-than-normal signal level does not exceed a level six decibels higher than the normal signal level.

5. The editing system of claim 4 wherein the higher-than-normal signal level is three decibels higher than the normal signal level.

6. An editing system for an information recorder containing a storage medium having a longitudinal axis, an erasing head for erasing information recorded on the storage medium with an erased track beginning perpendicularly with respect to the longitudinal axis of the storage medium, at least one rotary recording head for recording information on parallel tracks which form an acute angle with the longitudinal axis of the storage medium, and means for transporting said storage medium past said erasing head before passing said recording head, whereby a trapezoidally shaped unerased portion of said storage medium may pass said recording head, the editing system comprising:

(a) means for controlling the energization of the erasing head;

(b) means for energizing the recording head with a signal to be recorded at a higher-than-normal signal level during a period commencing approximately at the same time as the time at which the erasing head is energized and lasting for approximately the same interval as that required for a point on the storage medium to move from the proximity of the erasing head to the proximity of the recording head; and (c) means for de-energizing the recording head at the end of an interval which commences when the erasing head is de-energized and which equals the time required for a point on the storage medium to move from the proximity of the erasing head to the proximity of the recording head.

7. An editing system for a magnetic tape recorder having a magnetic tape, a recording head guide drum containing at least one rotary recording head for recording information on the magnetic tape, an erasing head for erasing information recorded on the magnetic tape with an erased path beginning perpendicularly to the longitudinal axis of the magnetic tape, said recording head recording information on parallel tracks which form an acute angle with the longitudinal axis of the magnetic tape, and means for transporting the magnetic tape past said erasing head before passing said recording head, whereby a trapezoidally shaped unerased portion of said magnetic tape may pass said recording head, the editing system comprising:

(a) means for controlling the energization of the erasing head;

(b) means for energizing the recording head with a signal to be recorded at a higher-than-normal signal level during a period commencing approximately at the same time as the time at which the erasing head is energized and lasting for approximately the same interval as that required for a point on the magnetic tape to move from the proximity of the erasing head to the proximity of the recording head;

(c) the means for energizing the recording head comprising:

(1) a first flip-flop circuit containing means for switching the flip-flop into a first output state upon the receipt of a start signal indicating the beginning of a new signal segment to be recorded and means for switching the flip-flop into a second output state upon the receipt of a reset signal indicating the end of a new signal segment which has been recorded;

(2) a second flip-flop containing means for switching the second flip-flop from a resting state to another state upon receipt of the start signal and means for returning the second flip-flop to its resting state at the end of the interval during which a portion of the new signal segment is being recorded over a portion of a signal segment already appearing on the tape;

(3) a bilevel gain control circuit containing means for amplifying a signal to be recorded to a normal recording level when the second flip-flop is in its resting state and for amplifying the signal to be recorded at a higher-than-normal recording level when the second flip-flop is in another state; and (4) a gate circuit containing means for transmitting the signal to be recorded to the gain control circuit when the first flip-flop is in the first output state and for preventing the transmission of the signal to the gain control circuit when the first flip-flop is in a second state.

8. The editing system of claim 7 wherein the first flip-flop comprises in addition:

means for delaying the switching of the first flip-flop into the second state for an interval commencing with the receipt of a reset pulse and lasting for a period equal to that which is required for a point on the magnetic tape to travel from the erasing head to the last point at which the recording head can record a signal on the tape.

9. The editing system of claim 7 wherein the higher-than-normal recording level is at least one decibel higher than the normal recording level.

10. The editing system of claim 9 wherein the higher-than-normal recording level does not exceed the normal recording level by more than six decibels.

11. The editing system of claim 10 wherein the higher-than-normal recording level is three decibels higher than the normal recording level.

References Cited

UNITED STATES PATENTS 3,342,949 9/1967 Wessels ............ 179—100.2

BERNARD KONICK, Primary Examiner

R. S. TUPPER, Assistant Examiner

U.S. Cl. X.R.

178—6.6